United States Patent
Yoneoka et al.

(10) Patent No.: US 10,185,397 B2
(45) Date of Patent: Jan. 22, 2019

(54) GAP SENSOR FOR HAPTIC FEEDBACK ASSEMBLY

(71) Applicant: Apple Inc., Cupertino, CA (US)

(72) Inventors: Shingo Yoneoka, Cupertino, CA (US); Chun Chit Lam, Cupertino, CA (US); Scott J. McEuen, Cupertino, CA (US); Peteris J. Augenbergs, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 14/847,114

(22) Filed: Sep. 8, 2015

(65) Prior Publication Data

US 2016/0259411 A1   Sep. 8, 2016

Related U.S. Application Data

(60) Provisional application No. 62/129,896, filed on Mar. 8, 2015.

(51) Int. Cl.
| | | |
|---|---|---|
| *G06F 3/01* | (2006.01) | |
| *G06F 3/0354* | (2013.01) | |
| *G06F 3/041* | (2006.01) | |
| *G06F 3/044* | (2006.01) | |
| *G06F 1/16* | (2006.01) | |

(52) U.S. Cl.
CPC .............. *G06F 3/016* (2013.01); *G06F 1/169* (2013.01); *G06F 3/03547* (2013.01); *G06F 3/044* (2013.01); *G06F 3/0414* (2013.01)

(58) Field of Classification Search
CPC ...... G06F 1/169; G06F 3/016; G06F 3/03547; G06F 3/0414; G06F 3/044
USPC ..................... 345/173–179; 178/18.01–18.09
See application file for complete search history.

(56) References Cited

U.S. PATENT DOCUMENTS

| | | |
|---|---|---|
| 5,142,912 A | 9/1992 | Frische |
| 5,345,807 A | 9/1994 | Butts et al. |
| 5,552,568 A | 9/1996 | Onodaka et al. |
| (Continued) | | |

FOREIGN PATENT DOCUMENTS

| | | |
|---|---|---|
| CN | 1496549 | 5/2004 |
| CN | 102236463 | 11/2011 |
| (Continued) | | |

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Stacy Khoo
(74) *Attorney, Agent, or Firm* — Brownstein Hyatt Farber Schreck, LLP

(57) ABSTRACT

An electromagnetic actuator provides haptic feedback in a computing device. The electromagnetic actuator includes an actuator gap between the moveable actuator plate and the actuator. A gap sensor measures the actuation gap between the force plate and the actuator. The gap distance between the moveable actuator plate and the actuator may vary due to various environmental or user factors. The amount of haptic feedback provided to a user may be made consistent by adjusting the force exerted by the actuator on the actuator plate in response to measured variations in the gap distance.

19 Claims, 10 Drawing Sheets

(56) References Cited

U.S. PATENT DOCUMENTS

| | | | |
|---|---|---|---|
| 5,905,430 A * | 5/1999 | Yoshino | B25J 13/084 340/407.1 |
| 5,911,158 A | 6/1999 | Henderson | |
| 6,069,417 A * | 5/2000 | Yuan | G03F 7/70758 310/12.07 |
| 6,099,476 A | 8/2000 | Engel | |
| 6,130,517 A * | 10/2000 | Yuan | G03F 7/70816 318/593 |
| 6,788,050 B2 | 9/2004 | Gotkis | |
| 7,046,496 B2 | 5/2006 | Hsin | |
| 7,084,933 B2 | 8/2006 | Oh et al. | |
| 6,998,545 B2 | 12/2006 | Harkcom et al. | |
| 7,451,050 B2 | 11/2008 | Hargreaves | |
| 7,463,987 B2 | 12/2008 | Cech et al. | |
| 7,536,918 B2 | 5/2009 | Rankin et al. | |
| 7,543,501 B2 | 6/2009 | Cottles et al. | |
| 7,683,634 B2 | 3/2010 | Hoen | |
| 7,688,308 B2 | 3/2010 | Inokuchi | |
| 7,825,903 B2 | 11/2010 | Anastas et al. | |
| 8,289,290 B2 | 10/2012 | Klinghult | |
| 8,290,602 B2 | 10/2012 | Begey et al. | |
| 8,305,358 B2 | 11/2012 | Klinghult | |
| 8,436,809 B2 | 5/2013 | Sohn et al. | |
| 8,547,114 B2 | 10/2013 | Kremin | |
| 8,547,118 B1 | 10/2013 | Vojjala | |
| 8,547,350 B2 | 10/2013 | Anglin et al. | |
| 8,599,165 B2 | 12/2013 | Westhues et al. | |
| 8,622,923 B2 | 1/2014 | Pons et al. | |
| 8,669,960 B2 | 3/2014 | Murphy et al. | |
| 8,760,248 B2 | 6/2014 | Marie | |
| 8,780,074 B2 | 7/2014 | Castillo et al. | |
| 8,860,437 B2 | 10/2014 | Santana et al. | |
| 8,917,198 B2 | 12/2014 | Pagnanelli | |
| 8,976,137 B2 | 3/2015 | Goo et al. | |
| 8,982,310 B2 | 3/2015 | Roudbari et al. | |
| 9,000,967 B2 | 4/2015 | Pagnanelli | |
| 9,013,414 B2 | 4/2015 | Kung et al. | |
| 9,052,250 B1 | 6/2015 | Parker et al. | |
| 9,063,627 B2 | 6/2015 | Yairi et al. | |
| 9,104,267 B2 | 8/2015 | Choi | |
| 9,105,255 B2 | 8/2015 | Brown et al. | |
| 9,268,432 B2 | 2/2016 | Guo | |
| 9,274,660 B2 | 3/2016 | Bernstein et al. | |
| 9,297,831 B2 | 3/2016 | Ahn et al. | |
| 9,310,950 B2 | 4/2016 | Takano et al. | |
| 9,373,993 B2 | 6/2016 | Irwin | |
| 9,389,727 B2 | 7/2016 | Woolley | |
| 9,411,454 B2 | 8/2016 | Fujioka et al. | |
| 9,477,342 B2 | 10/2016 | Daverman et al. | |
| 9,483,146 B2 | 11/2016 | Davidson et al. | |
| 9,495,056 B2 | 11/2016 | Takeda | |
| 9,726,922 B1 | 8/2017 | Agarwal et al. | |
| 9,727,168 B2 | 8/2017 | Fuller | |
| 9,830,025 B2 | 11/2017 | Han | |
| 9,891,738 B2 | 2/2018 | Huppi et al. | |
| 9,983,715 B2 | 5/2018 | Filiz et al. | |
| 2004/0100007 A1 * | 5/2004 | Engwall | G03F 7/709 267/140.13 |
| 2004/0119469 A1 * | 6/2004 | Gotkis | G01B 7/105 324/239 |
| 2004/0223283 A1 * | 11/2004 | Hsin | G03F 7/70758 361/160 |
| 2006/0256075 A1 * | 11/2006 | Anastas | G06F 3/016 345/156 |
| 2007/0268246 A1 | 11/2007 | Hyatt | |
| 2008/0011091 A1 | 1/2008 | Weldon | |
| 2008/0094075 A1 * | 4/2008 | Hoen | G01D 5/2412 324/661 |
| 2008/0289887 A1 | 11/2008 | Flint et al. | |
| 2009/0028321 A1 | 1/2009 | Cheng | |
| 2010/0005851 A1 | 1/2010 | Cottles et al. | |
| 2010/0123686 A1 | 5/2010 | Klinghult et al. | |
| 2010/0168877 A1 * | 7/2010 | Begey | G05B 9/03 700/82 |
| 2010/0309146 A1 | 12/2010 | Lee et al. | |
| 2011/0227872 A1 | 9/2011 | Huska et al. | |
| 2012/0038577 A1 | 2/2012 | Brown et al. | |
| 2012/0306798 A1 * | 12/2012 | Zoller | G06F 3/016 345/173 |
| 2012/0319827 A1 * | 12/2012 | Pance | G06F 3/016 340/407.1 |
| 2013/0127756 A1 | 5/2013 | Wang et al. | |
| 2014/0142395 A1 | 5/2014 | Sattler et al. | |
| 2014/0176485 A1 * | 6/2014 | Holmberg | G06F 3/041 345/174 |
| 2014/0298884 A1 | 10/2014 | Mindlin et al. | |
| 2015/0103961 A1 | 4/2015 | Malipatil et al. | |
| 2015/0160783 A1 | 6/2015 | Kaneko et al. | |
| 2015/0371608 A1 | 12/2015 | Yamaguchi et al. | |
| 2016/0179200 A1 * | 6/2016 | Billington | G06F 3/016 345/173 |
| 2016/0179243 A1 | 6/2016 | Schwartz | |
| 2016/0209441 A1 | 7/2016 | Mazzeo et al. | |
| 2016/0216833 A1 | 7/2016 | Butler et al. | |
| 2016/0259465 A1 | 9/2016 | Agarwal et al. | |
| 2017/0017346 A1 | 1/2017 | Gowreesunker et al. | |
| 2017/0052622 A1 | 2/2017 | Smith | |
| 2017/0090667 A1 | 3/2017 | Abdollahian et al. | |
| 2017/0147102 A1 | 5/2017 | Wang et al. | |
| 2017/0300146 A1 | 10/2017 | Han et al. | |
| 2017/0308207 A1 | 10/2017 | Azumi et al. | |
| 2017/0351368 A1 | 12/2017 | Agarwal et al. | |
| 2018/0039367 A1 | 2/2018 | Suzuki et al. | |

FOREIGN PATENT DOCUMENTS

| | | | |
|---|---|---|---|
| CN | 102713805 | 10/2012 | |
| CN | 103097990 | 5/2013 | |
| EP | 0178590 | 8/1986 | |
| EP | 1455264 | 8/2004 | |
| WO | WO 10/055195 | 5/2010 | |
| WO | WO 13/170099 | 11/2013 | |
| WO | WO 13/188307 | 12/2013 | |
| WO | WO 2014101943 A1 * | 7/2014 | G01B 7/14 |
| WO | WO 15/080696 | 6/2015 | |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

* cited by examiner

GAP SENSOR FOR HAPTIC FEEDBACK ASSEMBLY

CROSS-REFERENCE TO RELATED APPLICATION

This application claims the benefit under 35 U.S.C. § 119(e) to U.S. Provisional Application No. 62/129,896, filed Mar. 8, 2015, entitled "Gap Sensor for Haptic Feedback Assembly," the disclosure of which is hereby incorporated herein by reference in its entirety.

FIELD

The present disclosure generally relates to an electromagnetic actuator for providing haptic feedback in a computing device. More particularly, the disclosure relates to compensating for variations in the gap distance between the movable haptic output element and an actuator.

BACKGROUND

"Haptics" is a tactile feedback technology that simulates the sense of touch by conveying forces, vibrations or other motions to a person. The stimulation caused by various forms of motions may be used to provide tactile feedback in response to an input command or system state. Computers or other portable electronic devices may incorporate haptic actuators that generate these forces or motions to provide sensory feedback or acknowledgement to the user in response to some action taken, or direction given, by that user to the portable electronic device. For example, an input command generated by the user, a device operating state, in response to software executing on the device, and so on may be acknowledged by haptic output.

One example of a haptic actuator provides mechanical motion in response to an electrical stimulus. Some haptic feedback mechanisms use electro-mechanical technologies, such as vibratory motors, in which a central mass is moved to create vibrations at a resonant frequency. Other haptic feedback mechanisms use force generating devices attached to a touchpad or touchscreen to generate movement which may be sensed by a user. The quality of the haptic feedback may depend upon various manufacturing tolerances between the haptic feedback mechanism and the touchscreen.

SUMMARY

Tactile feedback may be provided using an actuator connected to a touchpad on a portable electronic device. The actuator may be controlled by actuator drive signals. As a user of an electronic device interacts with the touch pad, the user may make gestures and perform other touch-related tasks. When the user desires to select an on-screen object or perform other tasks of the type traditionally associated with button or keypad actuation events, the user may press downwards against the surface of the track pad. When sufficient force is detected, appropriate action may be taken and drive signals may be applied to the actuator. Other embodiments may use the direction of motion of a user's finger or other portion of the user's body along the touchpad to generate signals to the portable electronic device.

The actuator may be used to generate haptic feedback to acknowledge the user's movement and signal the user that his or her intended instruction has been received. Haptic technology can be applied to various input devices to improve human-computer interaction. For example, a trackpad or touch display can provide tactile feedback, such as a click or vibration, to the user by actuating the touch surface for predetermined displacements. The quality of the haptic feedback provided by the actuator may be deleteriously affected by various environmental factors or user misuse of the portable electronic device. For example, dropping the portable electronic device may affect certain preset manufacturing tolerances.

Haptic feedback devices typically have a mechanical gap between the movable plate and actuator/enclosure. This gap is carefully designed to provide enough travel distance to the movable plate while minimizing the adverse effect on the cosmetic appearance of the portable electronic device. Because the actuation force of some haptic actuators (ex. resistance actuator, electrostatic actuator) is a function of the gap between the movable part and actuator, the actuation force is calibrated during manufacture for a given actuation gap. However, this actuation gap can change during the usage of the haptic input devices. For example, the actuation gap might be changed due to mechanical shock in a drop event or due to the relaxation/deformation of the materials. The gap might be changed due to the user input. For example, in a trackpad, the drag motion by the user while exerting force on the trackpad may change the gap during the operation. The change of the actuation gap may result in inconsistent tactile feedback to the user. In a worst case scenario, the actuation force increases too much due to the smaller gap and the movable surface hits the actuator (or enclosure) which may cause damage to the device or generate unwanted acoustic noise.

Some prior devices control the haptic system by measuring the motion of the movable plate using a sensor such as an accelerometer. This method requires the actuation of the movable plate to obtain feedback information for the next actuation, and it does not work if the gap is dynamically changed by pressure exerted on the trackpad by the user during movement of the user's finger.

In one embodiment, the disclosed method uses an integrated sensor to measure the gap between the actuator and actuation plates (or trackpad's enclosure). The gap or gap change can be measured by capacitive, inductive, optical, or thermal sensors. The haptic system controls the actuation force based on the known transfer function calibrated in the factory during manufacture and the measured gap size to provide consistent tactile feedback to the user. In another embodiment, the mechanical design of the gap sensor integrated into the haptic system is disclosed. In yet another embodiment, a method for manufacturing a haptic system including a gap sensor is disclosed.

DETAILED DESCRIPTION

Figure 1:
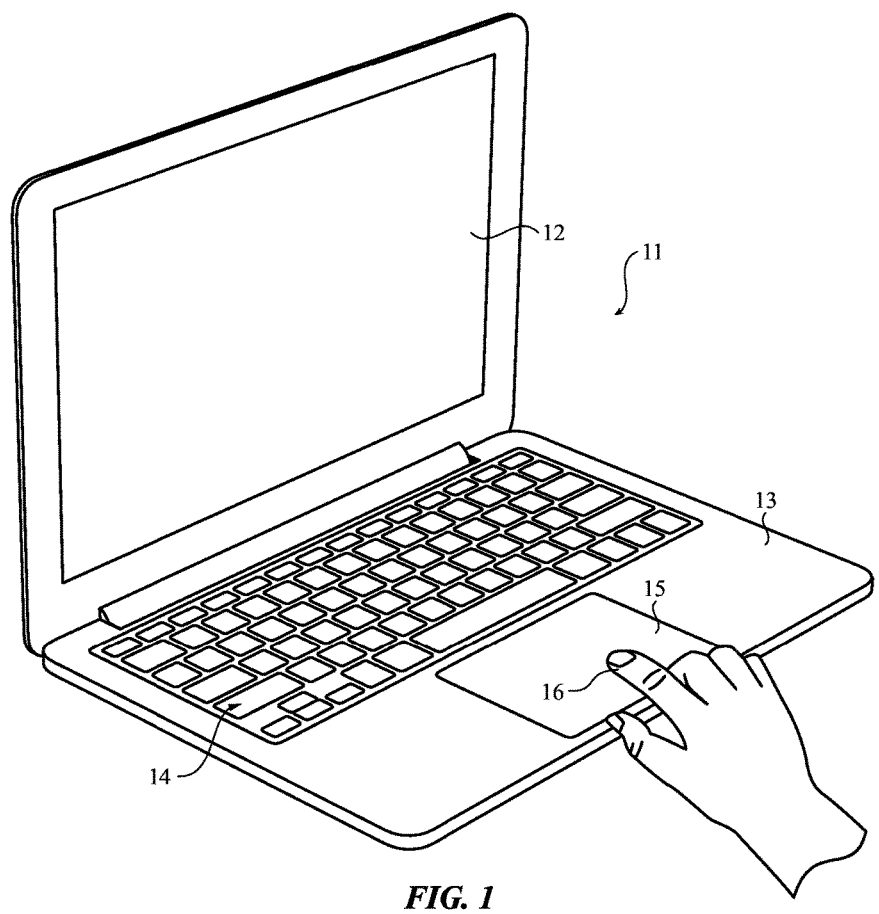
FIG. 1 is a perspective view of an electronic device including a trackpad.

The present disclosure may be understood by reference to the following detailed description, taken in conjunction with the drawings as briefly described above. It is noted that, for purposes of illustrative clarity, certain elements in the drawings may not be drawn to scale. Like reference numerals denote like structure throughout each of the various figures.

When a user interacts with a portable electronic device, he or she may be asked to provide certain inputs to the portable electronic device in order for that device to determine the needs and/or wishes of the user. In order to provide the user with tactile feedback to acknowledge and confirm the user input, haptics may be used. For example, a user may want tactile confirmation to acknowledge his or her instructions indicating which of various applications on a touchscreen that the user wishes to access. A user may also be prompted to adjust certain functions of the portable electronic device such as sound, picture quality etc. This may be done by touching an indicator displayed on a touchscreen or using a trackpad to move indicia on a screen. In some applications on a portable electronic device, a user may be prompted to select numbers or letters on a touchscreen to provide specific input to the portable electronic device. For example a user may spell a word or complete a form by entering a mark in a certain location. In all of the above situations, a user wants to ensure that the appropriate instruction that represents his or her true intention is selected. In order to satisfy this need for confirmation, the user may desire physical acknowledgement of this touch.

Physical confirmation could be made in a visual acknowledgement on a display by the portable electronic device which may confirm that the user instructions have been received. However, in some embodiments, the user may wish to receive physical acknowledgement in the form of haptic feedback from the portable electronic device that his or her commands or inputs have been received. This feedback may be made in the form of tactile feedback by applying forces, vibrations or motions to a finger or fingers of a user which may be in contact with the device during the input operation. In order to provide this haptic feedback, some portable electronic devices may incorporate actuators that apply forces or motion to a trackpad or touchscreen associated with the device which motion is sensed by a user as an output of the device.

Generally, embodiments described herein may take the form of a haptic assembly for providing haptic output to a user. A haptic actuator may provide the haptic output in response to an input signal or an output signal, or as part of an output signal. The actuator may vary its output in order to shape and control the haptic response and thus the sensation experienced by a user. In some embodiments, the actuator may be electromagnetically controlled. Embodiments described herein may be incorporated into a variety of electronic or electrical devices, such as a track pad, mouse, or other input (or output) device. The haptic device may be incorporated into an electronic device such as a laptop computer, smart phone, digital music player, tablet computing devices, portable computing devices, feedback or outputs for appliances, automobiles, touchscreens, and the like.

Haptic feedback in a portable electronic device may be provided by an actuator which electromagnetically interacts with an actuator plate which is separated from the actuator by a gap distance. Maintaining this gap distance is important to the operation of the haptic input device because the quality of the haptic feedback is dependent thereon. In some situations, a decrease in the gap distance could result in the actuator contacting the actuator plate and/or the contacting the portable electronic device itself. The gap may be set to an optimal distance during manufacture of the portable electronic device but it may change during use due to various factors such as from mechanical shock to the device due to dropping, environmental factors, or normal wear and tear on the device. Thus, by sensing the actual gap distance, the portable electronic device may compensate for any altered gap distance as will be described herein with respect to various embodiments. Even with an altered gap distance the portable electronic device will accept user input. However, the haptic feedback given as a result of those inputs may be deleteriously affected by an altered gap distance.

Referring to FIG. 1, a portable electronic device 11 which may be a laptop computer system typically includes a display 12 mounted on a housing 13. Display 12 may provide an image or video output for the electronic device 11. Display 12 may be substantially any size and may be positioned substantially anywhere on the electronic device 11. In some embodiments, the display 12 may be a liquid crystal display screen, plasma screen, light emitting diode screen, and so on. The display 12 may also function as an input device in addition to displaying output from the electronic device 12. For example, display 12 may include capacitive touch sensors, infrared touch sensors, or the like that may capture a user's input to the display 12. In these embodiments, a user may press on the display 12 in order to provide input to the electronic device 11. In alternate embodiments display 12 may be separate from, or otherwise external to, the electronic device 11, but may be in communication therewith to accept user inputs and provide a visual output for electronic device 11.

Referring again to FIG. 1, portable electronic device 11 may further include user interfaces such as a keyboard 14 and a trackpad 15 to allow a user to provide input to computer system 11. In other embodiments one type of input may be input force from a user's finger 16 on touch pad 15. The user may desire to receive feedback from the portable electronic device to confirm the user's selection on the touchpad. This feedback may take the form of haptic feedback which may also be combined with visual feedback on display 12.

Figure 2:
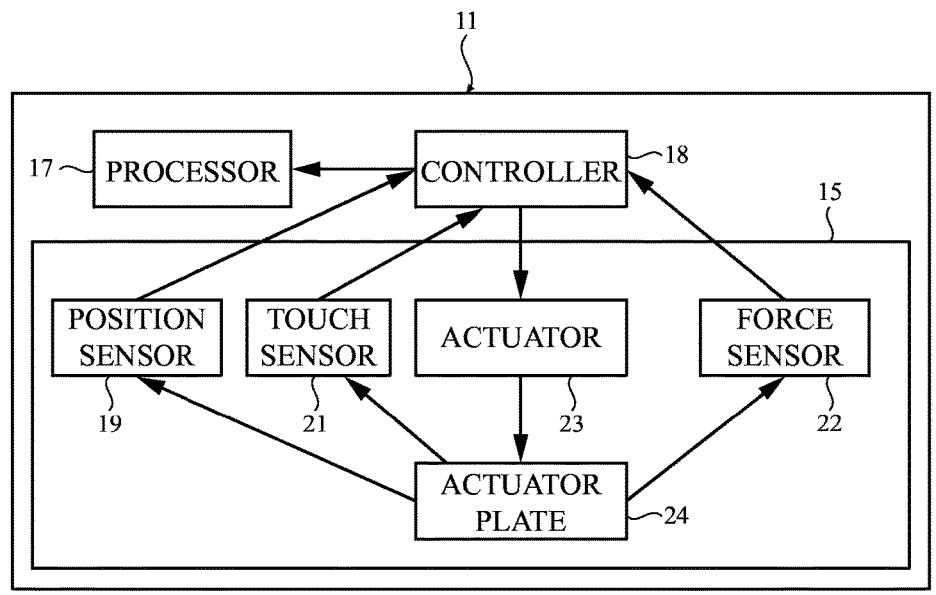
FIG. 2 is a block diagram illustrating a computer system.

FIG. 2 is a schematic illustrating a sample electronic device 11 including a haptic device in accordance with one embodiment. The device 11 includes a processing unit 17, a controller 18, and a trackpad 15 or other input mechanism. Controller 18 and/or processor 17 may execute instructions and carry out operations associated with portable electronic devices as are described herein. While computer system includes a processor 17 and controller 18, in some embodiments the functions of controller 18, as described herein, may be implemented by processing unit 17 and controller 18 may be omitted. Using instructions from device memory, controller 18 may regulate the reception and manipulation of input and output data between components of electronic device 11. Controller 18 may be implemented as one or more microprocessors, application specific integrated circuits (ASICs) and so forth. Controller 18 together with an operating system may execute computer code and manipulate data. The operating system may be a well-known system such as iOS, Windows, Unix or a special purpose operating system or other systems. Controller 18 may include memory or other storage devices to store the operating system and data. Controller 18 may also include application software to implement various functions associated with portable electronic device 11.

Input mechanism 15 may include a trackpad or other input device and, in some embodiments, may include at least one position sensor 19 and/or at least one touch sensor 21 and/or at least one force sensor 22, as well as one or more actuators 23 and/or an actuator plate 24. Touch sensor 21 may, in some embodiments be a touch switch. Touch switch may include capacitive, resistive or optical sensors or any other suitable sensor. Further, if the touch sensor is capacitive, it may include self-capacitive or mutual-capacitive sensors.

Each of the touch sensor(s) 21, the position sensor(s) 19, the force sensor(s) 22 and actuator 23 are electrically and/or mechanically coupled to the trackpad 15, controller 18 and/or processing unit 17. Touch sensors 21 may determine the location of one or more touches by a user on the haptic device. The touch sensor(s) 21 and the force sensor(s) 22 detect the location and force of a touch on the trackpad 15 respectively and send corresponding signals to the controller 18. Actuator 23 may be in communication with controller 18 and/or the input sensors and may generate an electromagnetic signal to actuator plate 24 affixed to trackpad 15 which may provide movement to all or a portion of the surface of trackpad 15 in response to the signal from controller 18. That is, the input signals which are sensed by one of sensors 19, 21 an/or 22 are sent to controller 18 which, in turn, directs actuator 23 to generate an electromagnetic signal which will cause actuator plate 24 to move toward or away from actuator 23 depending upon the signal. As actuator plate 24 is affixed to trackpad 15, movement of actuator plate 24 will result in movement of trackpad 15. The haptic output is then based upon the one or more input signals from sensors 19 and/or 21 and/or 22 sent to controller 18.

Some embodiments described herein may take the form of a haptic device for use with an associated electronic device such as computer system 11. The haptic device may vary output provided to the user through a touchpad or other device on computer 11 based on a number of different inputs to the haptic device. Additionally, the haptic device may vary one or more inputs provided to the computer device 11 based on the user inputs. Inputs to computer device 11 may include a processor or device command based on a system state, application activity, sensor data, and so on. Thus, the haptic device may adapt the output, as well as the types of input provided to computer 11 by the haptic device, based on one or more characteristics, settings, or inputs in a particular application.

As another example, the haptic device may provide varying feedback depending on the particular application running on the electronic device, the force input member (e.g., index finger, thumb or palm of the user used to provide input), the amount of input force, the speed and/or acceleration of the input force, the length of time of an input force, location of the electronic device, and/or various other types of data inputs that may be provided to the haptic device, to the electronic device, or a combination of both. It should be noted that the data inputs to vary the output of the haptic device may be provided by a user, the haptic device, and/or the electronic device 11.

When using trackpad 15 to provide input to the computer system 11, a user may move his or her finger 16 on trackpad 15 to a desired location. The user may also touch trackpad 15 at a desired location to provide input. Touch sensor(s) 21 and the force sensor(s) 22 detect the location and force of the touch on trackpad 15 respectively and send corresponding signals to the controller 18. Controller 18 communicates with processing unit 17 inside computer system 11 and processing unit 17 may generally instruct controller 18 with respect to certain operations. For example, in one embodiment, processing unit 17 and controller 18, in combination, use these signals to determine if the location of the touch correlates with a specific application or a user interface (UI) element. If the location is within the range for the specific application or UI element, processing unit 17 further determines if the force signal is above a threshold. If so, processor 17 may validate the force signal as a selection of the application of UI element. If the force signal is not a false signal, then controller 18 activates actuator 23 which combines with actuator plate 24 to move the surface of the trackpad 15 beneath user's finger 16. The user may sense this motion, thereby experiencing haptic feedback in response to the application or UI element selection.

In another embodiment, track pad 15 may detect user input, such as user touch or user force. In this embodiment, substantially any type of user input detected may be used to provide feedback to the user. Based on the user input, track pad 15 may be activated by the processor 17 to move or vibrate in order to provide haptic feedback to a user. In some instances, the user input may be correlated to a specific application or UI element, in which case the location of the user input may be analyzed to determine if output to the user is desired. In other embodiments, the mere detection of a user input may be sufficient to initiate haptic feedback. It should be noted that haptic feedback may be provided in response not only to a user input, an example of which is provided above, but also in response to system operation, software status, a lack of user input, passage of user input over UI elements(s) (e.g. dragging a cursor over a window, icon, or the like), and/or any other operating condition of computer system 11.

Figure 3:
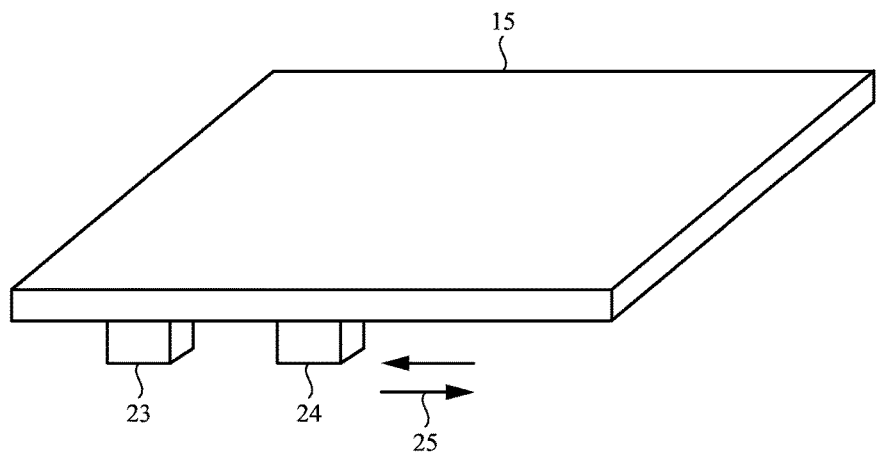
FIG. 3 is a perspective view showing an input/output device which includes touch sensitive surface and an input actuator.

Referring to FIG. 3, a perspective view of a track pad 15 is shown. As mentioned above, the quality of the haptic feedback provided to a user may depend upon the quality of the interconnections which couple actuator plate 24 to the user sensing surface such as track pad 15. Movement of trackpad 15 is accomplished by actuator 23 sending electromagnetic signals to move an actuator plate 24 connected to trackpad 15 to provide vibratory or other motion to trackpad 15. Trackpad 15 may be moved in the direction of arrows 25 by the combined electromagnetic and mechanical operation of actuator 23 and actuator plate 24. The association and interconnection of trackpad 15, actuator 23, and actuator plate 24 will be described in more detail below with respect to FIGS. 4-15.

Figure 4:
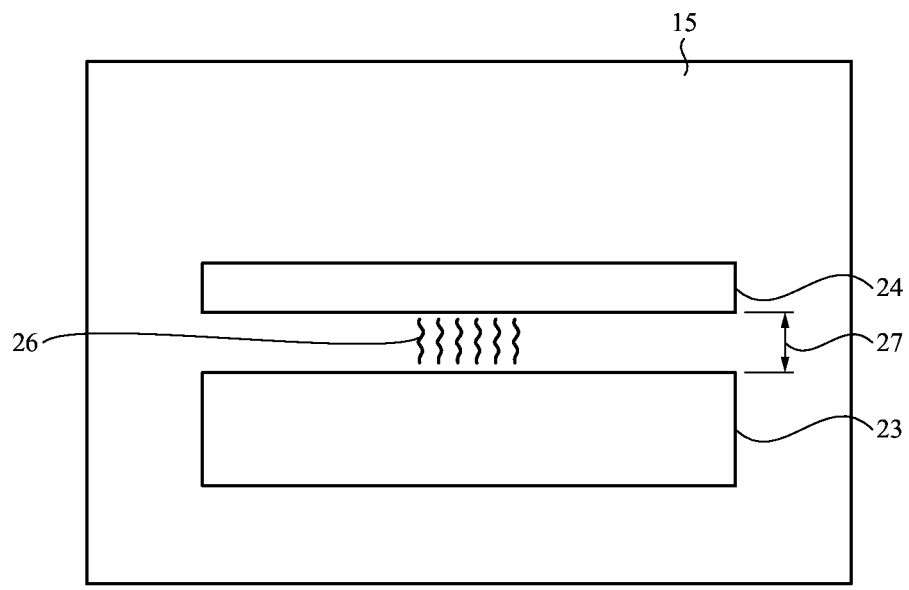
FIG. 4 is a bottom plan view of the input/output device of FIG. 3.

Referring to FIG. 4, in one embodiment, a bottom view of a force assembly including trackpad 15, actuator 23 and actuator plate 24 is shown. The interaction of actuator 23 and actuator plate 24, as energized through electromagnetic field 26 across an actuation gap 27, provide the force to trackpad 15. Electromagnetic signals 26 sent from actuator 23 to plate 24 move plate 24 toward actuator 23 or away from actuator 23 or both (vibratory). This movement may be felt by a user as haptic output on touch pad 15 or other device.

Figure 5:
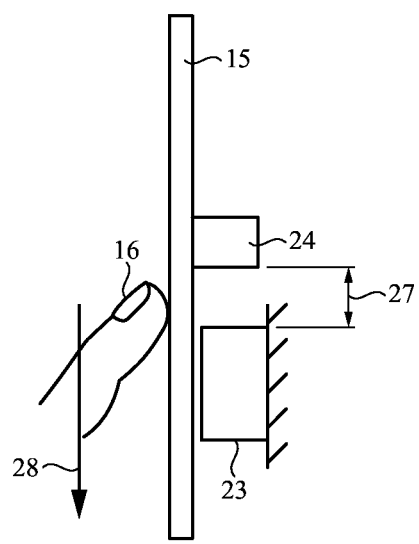
FIG. 5 is a side view of the input output device illustrated in FIGS. 3 and 4.

Referring to FIG. 5, a side view of the embodiment shown in FIG. 4 is shown. Trackpad 15 may include multiple layers, such as: a gel plate layer (or one or more gel structures) that may provide grounding functions and may operate to restore the actuator plate and/or contact plate to a location after a haptic output is produced; a sensor plate or structure that may sense force and/or touch; and a contact plate for contact by a user. The contact plate may be made from glass or any other suitable material. Movement of user's finger 16 in the direction of arrow 28 in a drag and click function on trackpad 15 may reduce actuation gap 27 by moving actuation plate 24 (and connected trackpad 15) toward actuator 23 due to the force exerted in direction 28 by user finger 16 on trackpad 15. In one embodiment, the actuation gap set during manufacture may be about 300 microns (0.3 mm). The reduction in actuation gap 27 results in an increase in the actuation force exerted by actuator 23 on actuation plate 24. Conversely, movement of user finger 16 in the opposite direction to arrow 28 may result in a decrease in actuation force exerted by actuator 23 on plate 24 due to lengthening of gap 27. This change in actuation force may, over time, result in inconsistent tactile feedback to a user and may even result in actuator plate 24 contacting actuator 23 or other portions of device 11 which may cause damage to the device or generate unwanted acoustic noise.

Figure 6:
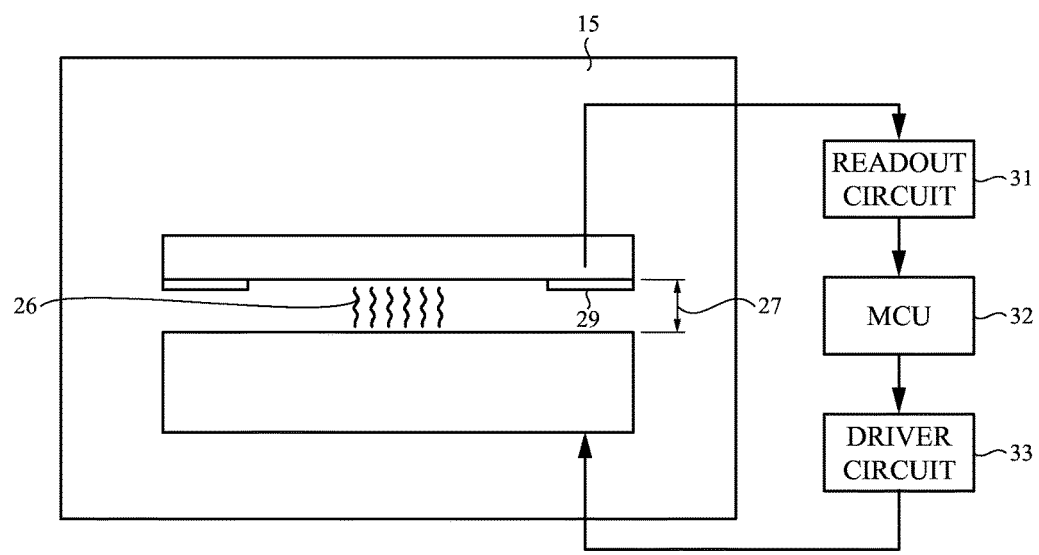
FIG. 6 shows a schematic of the control circuitry for an actuation plate and an actuator.

Referring to FIG. 6, in one embodiment, actuation gap 27 may be measured using a gap sensor 29 to measure the gap distance 27 between actuator plate 24 and actuator 23. In one embodiment, sensor 29 may be a capacitive sensor, an inductive sensor, an optical proximity sensor and/or other type of sensor as will be discussed below. Changes in actuation gap 27 may be compensated for by control circuitry including readout circuit 31, micro controller unit 32 and driver circuit 33. The actuation force is varied by varying the amount of input current to actuator 23 based upon the sensed actuation gap size 27. The gap sensor monitors the gap distance in real time and may thus permit the device to compensate for changes in gap distance by changing the input current. The exerted force between actuator 23 and actuator plate 24 varies inversely with the square of actuator gap size 27. That is, the amount of actuation force exerted by actuator 23 may be varied based upon the transfer function of actuator 23 in combination with the variation in gap 27 due to the force exerted by a user or other conditions such as a dropping event which may change the gap distance 27.

In one embodiment, the measurement of gap 27 may be continuously measured while in another embodiment, gap 27 may be measured only when a user is in contact with trackpad 15. In the embodiment where gap 27 is continuously measured, electromagnetic interference from the actuator apparatus must be compensated for. In either embodiment, the amount of force exerted by actuator 23 on actuator plate 24 may be varied in real time to compensate for variations in gap 27 such that the haptic output may be perceived by the user as consistent despite variations in user force exerted on trackpad 15 or abnormalities in actuation gap size 27 due to various environmental, user, or misuse (e.g. dropping) conditions.

Figure 7:
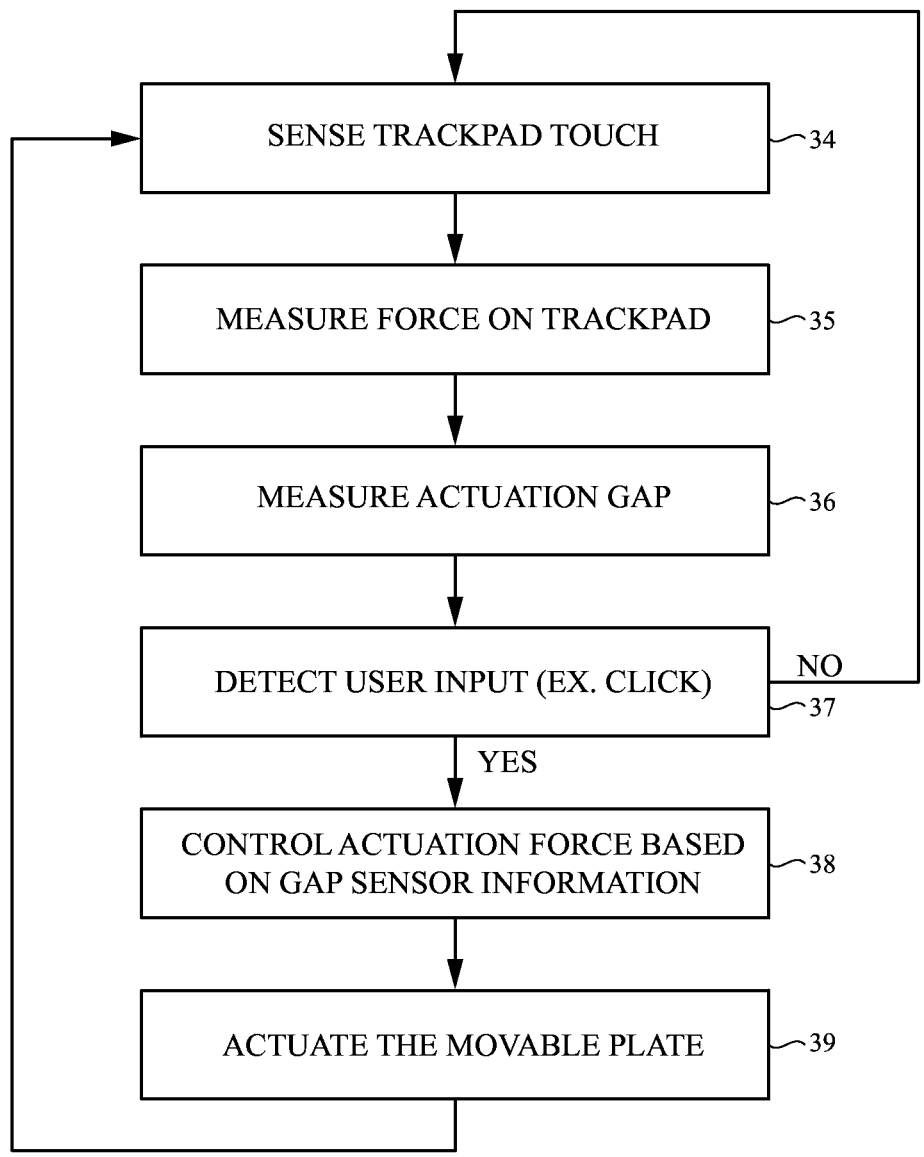
FIG. 7 is a flowchart of a sample method for measuring an input and outputting a haptic effect that is controlled for a gap spacing.

Referring to FIG. 7, a flow chart of one embodiment of a method for exerting force on actuation plate 24 is disclosed. In operation 34, trackpad touch sensor 21 senses a user touch on trackpad 15. In operation 35, the amount of force exerted by user 16 may be measured by force sensor 22. Both operations 34 and 35 are optional and may provide additional input to vary the output of the haptic device. In operation 36, the actuation gap sensor 29 measures actuation gap 27. If the measured force on trackpad 15 is determined to be user input, such as a "click" at operation 37, then the haptic feedback in the form of actuation force may be varied in operation 38 based upon the sensed gap 27. If the measured force in operation 37 is determined not to be from user input such as a click or tap then the system returns to operation 34 (or 36 if optional operations 34 and 35 are omitted). Based upon the controlled actuation force from operation 38, a user experiences haptic feedback in operation 39 by movement of actuator plate 24 and the attached trackpad or other surface. Thus, the haptic feedback experienced by the user remains constant even if actuation gap 27 changes due to various environmental, user, or misuse (e.g. dropping) events which could alter the actuation gap and thus increase or decrease the haptic feedback output.

Capacitive sensing is based upon capacitive coupling which (in some embodiments) takes human body capacitance as input. There are two types of capacitive sensing systems: mutual capacitance where the finger or other input mechanism alters the mutual coupling between electrodes; and self-capacitance where the object such as a finger or stylus in which a finger or other input mechanism changes an electrode's capacitance to ground. Either type of capacitive sensor system may be used in various embodiments.

Figure 8:
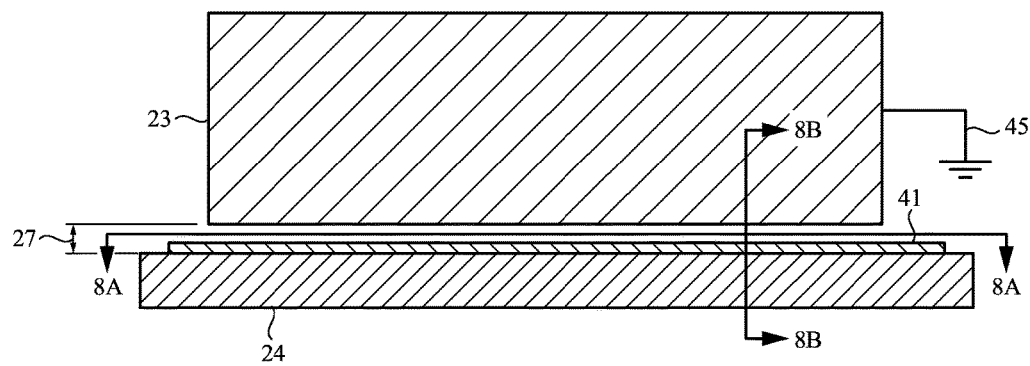
FIG. 8 is a top view of an actuator and actuator plate with a flexible circuit attached to the actuation plate.
Figure 8A:
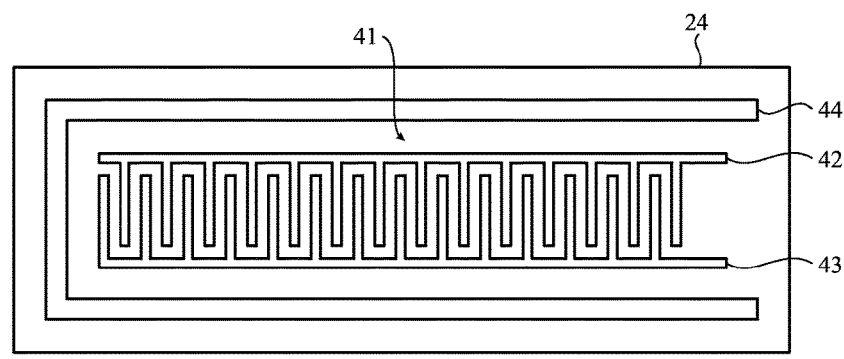
FIG. 8A is a sectional view through line 8A-8A of FIG. 8.
Figure 8B:
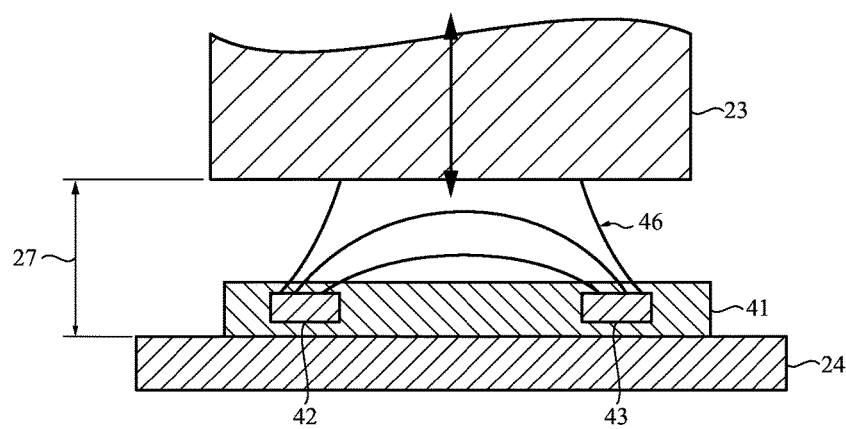
FIG. 8B is a sectional view through line 8B-8B of FIG. 8.

Referring to FIG. 8, an embodiment using a mutual capacitance sensor is shown. In FIG. 8 a top view of actuator 23 and actuator plate 24 is shown with flexible circuit 41 attached to actuation plate 24 by pressure sensitive adhesive or other means. An actuation gap 27 which may, in one embodiment, be preset during manufacturing at 0.3 mm (300 microns) separates actuator 23 from actuation plate 24. Referring to FIG. 8A, a top view of flexible circuit 41 is shown with sense electrodes 42 and drive electrodes 43 surrounded by ground shield trace 44. Referring to FIG. 8B, a cross-sectional view is taken along line 8B-8B from FIG. 8. Drive electrode 43 and sense electrode 42 are shown with electromagnetic field 46 generated between actuator 23 and electrodes 42 and 43. As discussed above, the capacitance between electrodes 42/43 and actuator 23 changes depending upon the size of gap 27. In one embodiment, the input current to actuator 23 is varied to compensate for this change in gap size and thus movement of actuation plate 24 induced by the electromagnetic field 46 generated by actuator 23 is also varied such that the generated movement, as felt by the user, remains consistent despite variations in the size of gap 27.

Figure 9:
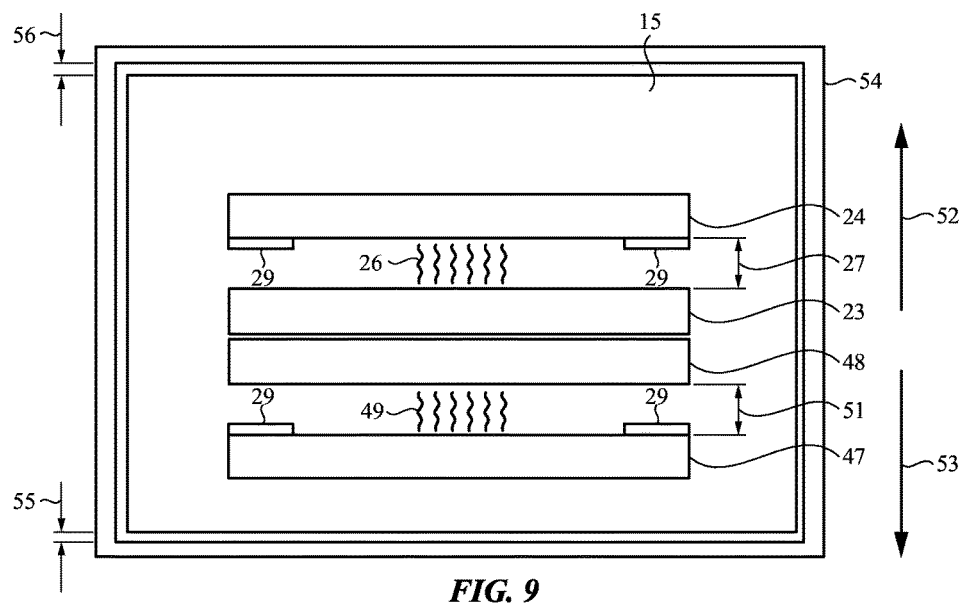
FIG. 9 is a bottom view of a force assembly including a second actuator and second actuator plate positioned adjacent to a first actuator.

Referring to FIG. 9, an alternate embodiment is shown using multiple actuators and actuator plates. A bottom view of a force assembly including trackpad 15, actuator 23 and actuator plate 24 is shown with a second actuator 47 and a second actuator plate 48 positioned adjacent to actuator 23. In this embodiment, actuator 48 and actuator plate 47 have been added to the embodiment shown in FIG. 6. The interaction of each actuator 23 and 48 with its corresponding attraction plate 24 and 47 provide the force to trackpad 15 as energized through electromagnetic field 26 and 49 across corresponding actuation gaps 27 and 51. As with the embodiment shown in FIG. 6, gap sensors 29 are used to measure gap distances 27 and 51 and the electromagnetic force 26 may be varied depending upon the changes in gap distances 27 and 51. This embodiment using multiple actuators and plates allows the apparatus to differentiate movement of user's finger 16 on trackpad 15 in either direction up 52 or down 53.

Referring again to FIG. 9, trackpad 15 is movably placed within housing 54 to allow user 16 to move trackpad 15 within the boundaries of housing 54. A lower cosmetic gap 55 and an upper cosmetic gap 56 which are nominally the same allow movement of trackpad 15 with respect to housing 54 while preventing trackpad 15 from contacting housing 54 which could damage components and may not be aesthetically satisfactory to user 16. By measuring an actuator gap in real time and compensating for changes, the movement of trackpad 15 within housing 54 from haptic output may be better controlled thus preventing contact of trackpad 15 with housing 54. Trackpad 15 may include multiple layers, such as: a gel plate layer (or one or more gel structures) that may provide grounding functions and may operate to restore the actuator plate and/or contact plate to a location after a haptic output is produced; a sensor plate or structure that may sense force and/or touch; and a contact plate for contact by a user. The contact plate may be made from glass or any other suitable material.

Figure 10:
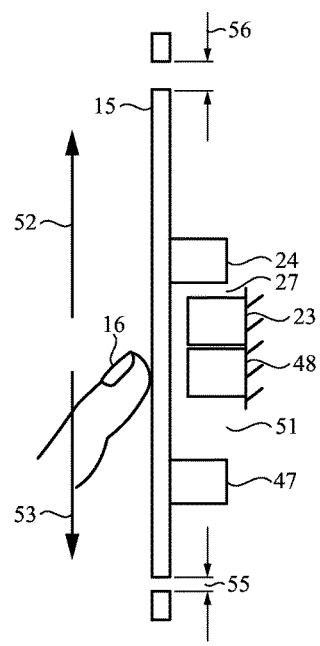
FIG. 10 is a side view of the embodiment shown in FIG. 9.

Referring to FIG. 10, a side view of the embodiment shown in FIG. 9 is illustrated. Movement of user's finger 16 in the downward direction of arrow 53 in a drag and click function on trackpad 15 reduces actuation gap 27 by moving actuation plate 24 toward actuator 23 due to the force exerted on trackpad 15 by user finger 16. This same movement and force increases actuation gap 51 between actuator 48 and actuation plate 47. In one embodiment, the actuation gaps 27 and 51 are set during manufacture to be about 300 microns (3 mm). The reduction in actuation gap 27 results in an increase in the actuation force exerted by actuator 23 and actuation plate 24 and a decrease in actuation force exerted by actuator 48 and actuation plate 47. Similarly, this movement results in an increase in cosmetic gap 56 and a decrease in cosmetic gap 55. Movement of user finger 16 in the opposite direction 52 may result in a decrease in actuation force exerted by actuator 23 and actuation plate 24 and an increase in actuation force exerted by actuator 48 and actuation plate 47 and a resultant decrease in cosmetic gap 56 and an increase in cosmetic gap 55. By measuring the gap distances 27 and 51 in real time and varying actuation force 26/49 to compensate for variation in gap distances 27/51, this embodiment may vary the actuator signals to actuator plates to provide consistent haptic feedback experience to a user no matter which direction, 52 or 53, a user moves his or her finger 16 on trackpad 15.

The embodiment shown in FIGS. 9 and 10 may utilize the actuator 23 and actuator plate 24 in combination with additional actuator 47 and actuator plate 48 positioned adjacent to actuator 23 to provide restorative force to trackpad 15. In many devices, gel layers (not shown) between trackpad 15 and housing 54 are typically used to provide such restorative force. For example, in the embodiment shown in FIG. 10, if user's finger 16 moves trackpad 15 in a downward direction 53, actuator 23 and actuator plate 24 may be used to move trackpad 15 in direction 52 to substantially equalize gaps 27 and 51 and cosmetic gaps 55 and 56 in addition to the restorative force usually provided by gel layer interfaces used to mount trackpad 15 on portable electronic device 11.

Figure 11:
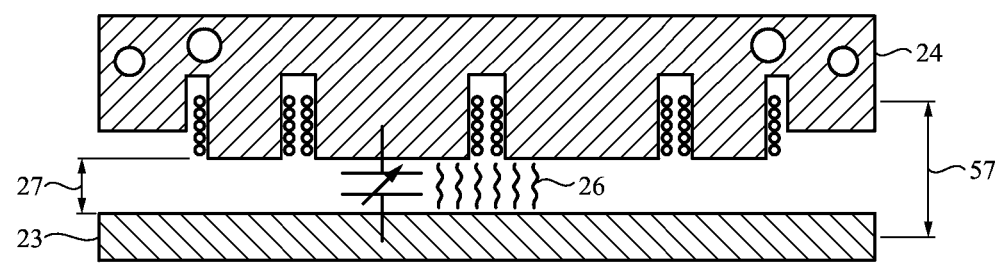
FIG. 11 shows a parallel plate self-capacitance sensor used to detect a gap distance in one embodiment.

Sensor 29, as discussed above, may be, for example, a parallel plate self-capacitance sensor. Referring to FIG. 11, one embodiment using a self-capacitive sensor 29 is shown. As discussed above, this self-capacitive sensor may be attached to actuator plate 24 using adhesive or other means. A voltage differential 57 between actuator plates (stator) 24 and actuator (armature) 23 changes as a function of the change in the actuation gap 27. That is, the change in capacitance is a function of a change in voltage which is in turn a function of the change in gap distance 27 between actuator 23 and actuator plates 24. Gap distance 27 is measured in real time as user's finger 16 moves on trackpad 15 and the change in gap distance 27 is used to alter voltage differential 57 to compensate for changes in the haptic force which would otherwise be exerted by haptic output device due to changing gap distance 27. By varying the voltage differential as a function of changing gap distance 27 the generated movement of actuation plate 24, as felt by the user, remains consistent despite variations in the size of gap 27.

Figure 12:
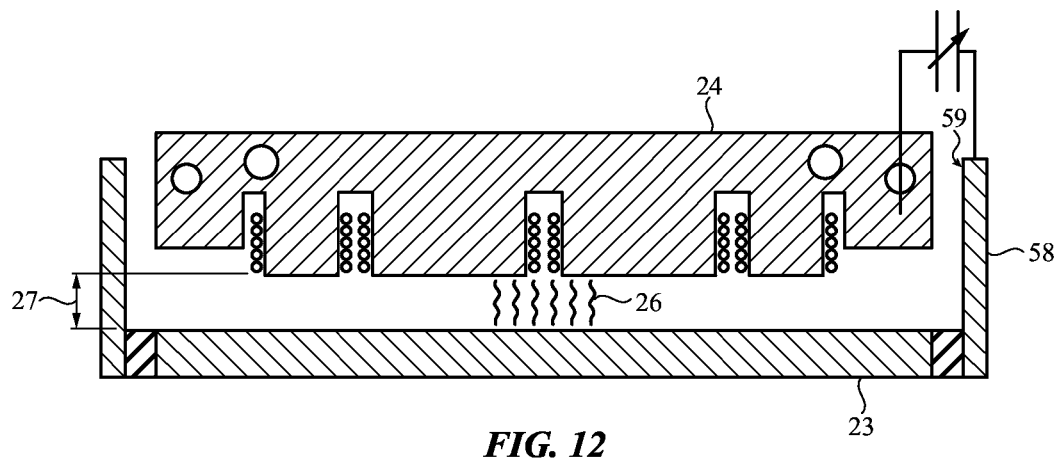
FIG. 12 shows a mutual capacitive comb finger type sensor used to detect a gap distance in an alternate embodiment.

Referring to FIG. 12, in another embodiment, a sensor (which may be a mutual capacitive comb finger type sensor) is used to sense gap 27. In this embodiment, actuator 23 includes end portions 58. As actuator plate 24 moves with respect to actuator 23, the resulting change in the actuation gap distance 27 results in a change in the capacitance measured between end portions 58 and actuator plate 24. The change in capacitance is due to the change in surface area 59 of end portions 58 which is adjacent to plate 24. The change in capacitance is then a function of a change in the distance 27 between actuator 23 and actuator plate 24 respectively. Distance 27 may be measured as user's finger 16 moves on trackpad 15 and the change in distance 27 is used to modify the haptic force output exerted by haptic feedback device. By varying the electromagnetic force 26 between actuator 23 and actuator plate 24 as a function of changing gap distance 27 the generated movement of actuation plate 24, as felt by the user, remains consistent despite variations in the size of gap 27.

Figure 13:
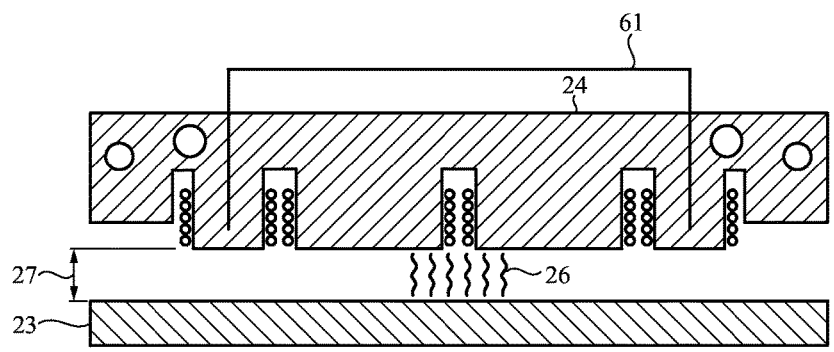
FIG. 13 shows an eddy current sensor used to detect a gap distance in another embodiment.

Referring to FIG. 13, in another embodiment, sensor 29 may be an eddy current sensor. Eddy currents are electric currents induced within conductors by a changing magnetic field in the conductor, due to induction. A coil 61, may measure the amount of eddy current flow. The magnitude of the current in coil loop 61 is proportional to the strength of the magnetic field 26 induced between actuator 23 and actuator plate 24 which is a function of the gap distance 27 and thus eddy current sensor shown in FIG. 13 may be used to measure the change in gap distance 27. Distance 27 is measured as user's finger 16 moves on trackpad 15 and the change in distance 27 is used to compensate for changes in the haptic force exerted by haptic feedback device. The electromagnetic field 26 generated by actuator 23 is also varied as a function of changing gap distance 27 such that the generated movement of actuation plate 24, as felt by the user, remains consistent despite variations in the size of gap 27.

Figure 14:
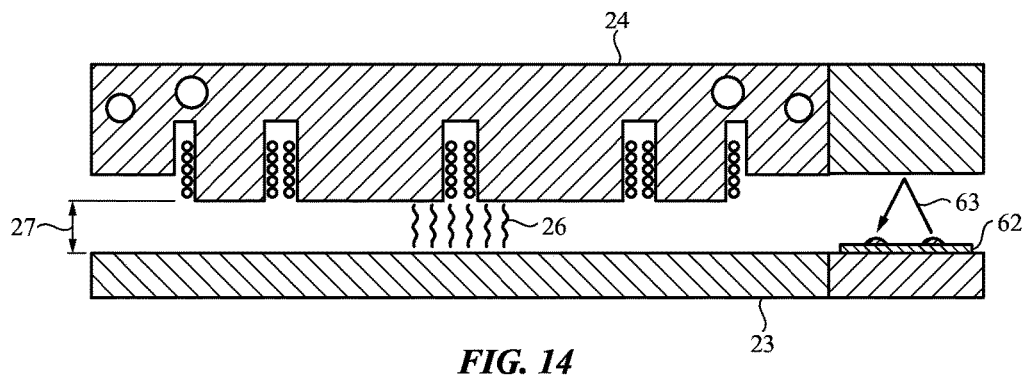
FIG. 14 shows an optical sensor used to detect a gap distance in another embodiment.

Referring to FIG. 14, an optical sensor which may be a photoelectric sensor 62 may be used as sensor 29. In this embodiment, optical sensor 62 measures the gap distance 27 between actuator 23 and actuator plate 24. A light beam 63 is emitted from sensor 62 to actuator plate 24 and reflected back to sensor 62 to measure the distance 27 between actuator plate 24 and actuator 23. Distance 27 is measured as user's finger 16 moves on trackpad 15 and the change in distance 27 is used to compensate for changes in the haptic force exerted by haptic feedback device. By varying the electromagnetic force 26 between actuator 23 and actuator plate 24 as a function of changing gap distance 27, the generated movement of actuation plate 24, as felt by the user, remains consistent despite variations in the size of gap 27.

Figure 15:
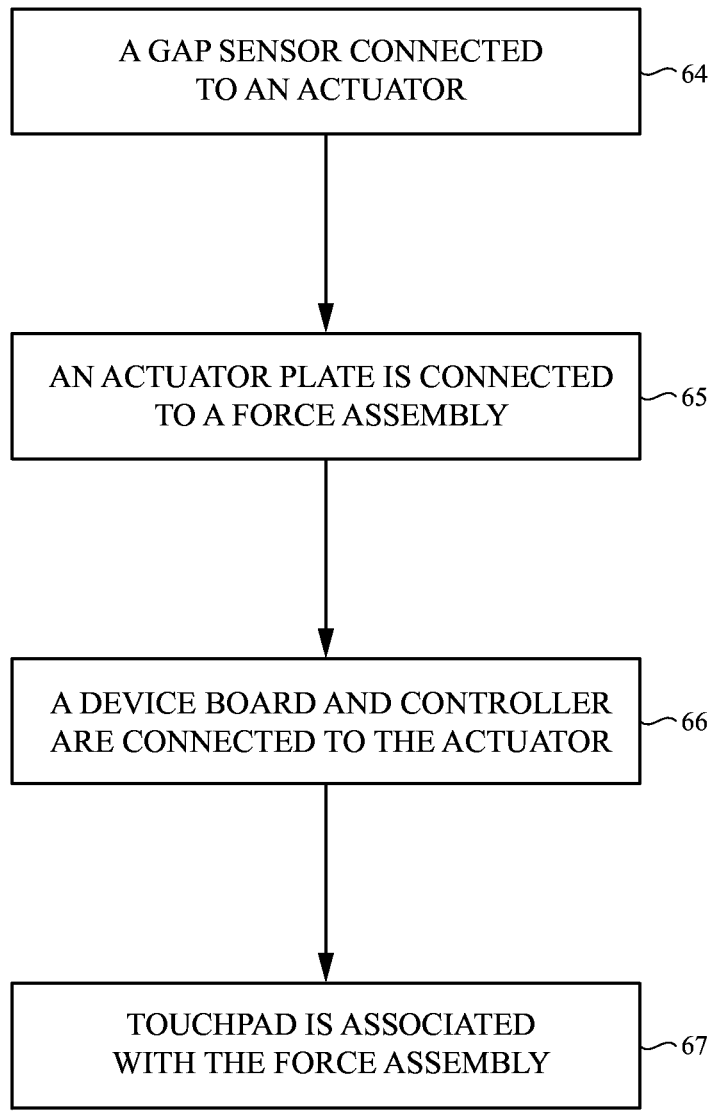
FIG. 15 is a flow chart illustrating a method for manufacturing a trackpad.

Referring to FIG. 15, a flow chart illustrating the operations for manufacturing a trackpad including a haptic feedback device is shown. At operation 64, a gap sensor 29 is connected to an actuator. In operation 65, an actuator plate is connected to a force assembly. This secure mechanical interconnection between actuator plate and force assembly results in vibrational, lateral, or other movement induced by the actuator being efficiently transferred to the actuator plate and thus to the force assembly. At operation 66, a device board which may include a controller is securely connected to the actuator to supply and control power to the actuator. The touchpad is associated with the force assembly in operation 67 which may include placement of flexible pads, which may be a foam or gel pad, between the force assembly and the touchpad assembly. The touchpad assembly may include a gel plate layer (or set of gel structures), a sensor plate or other sensor apparatus, and a contact plate or other structure for contact by a user's person.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A portable electronic device comprising:
    a housing;
    a touch assembly associated with the housing and configured to detect a user interaction with the portable electronic device;
    a first actuator plate assembly associated with the touch assembly;
    a first actuator separated from the first actuator plate assembly by a first gap, the first gap having a variable dimension parallel to a touch surface of the touch assembly; and
    a first sensor configured to measure a change in the first gap due to the user interaction with the touch assembly; wherein,
    an electromagnetic signal is generated by the first actuator as a function of the measured change in the first gap;
    the electromagnetic signal provides an actuation force to the first actuator plate assembly; and
    the actuation force provided to the first actuator plate assembly provides haptic output to a user through the first actuator plate assembly and the touch assembly; and
    the provided haptic output is consistent across different measured changes in the first gap.

2. The portable electronic device of claim 1 wherein the first sensor is a capacitive sensor.

3. The portable electronic device of claim 2 wherein the capacitive sensor is a parallel plate sensor.

4. The portable electronic device of claim 2 wherein the capacitive sensor is a comb finger sensor.

5. The portable electronic device of claim 1 wherein the first sensor is an eddy current sensor.

6. The portable electronic device of claim 1 wherein the first sensor is an optical sensor.

7. The portable electronic device of claim 1 wherein the user interaction with the portable electronic device comprises at least one of a touch, a touch location, or a force.

8. The portable electronic device of claim 7, wherein movement of the first actuator plate assembly provides an acknowledgement of the user interaction.

9. The portable electronic device of claim 1 further comprising:
    a second actuator plate assembly associated with the touch assembly;
    a second actuator separated from the second actuator plate assembly by a second gap; and
    a second sensor associated with the second actuator plate assembly to measure a change in the second gap.

10. The portable electronic device of claim 1 further comprising:
    a controller configured to communicate with the sensor and the actuator.

11. The portable electronic device of claim 10 wherein the controller is configured to cause the actuator to supply the electromagnetic input to the actuator plate assembly.

12. The portable electronic device of claim 1 wherein the controller is configured to cause the actuator to supply the electromagnetic input to the actuator plate assembly when the user interaction is determined to correlate with a specific application or a specific user interface element.

13. A method for generating haptic feedback on a trackpad comprising the steps of:
    sensing a user touch on the trackpad;
    determining an amount of force generated by the sensed user touch and a location of the sensed user touch;
    measuring, during the sensed user touch, a change in a first actuation gap between a first actuator and a first actuator plate associated with the trackpad, the first actuation gap having a variable dimension parallel to a touch surface of the trackpad;
    generating, by the first actuator, an electromagnetic signal that is a function of the measured change in the first actuation gap; and
    electromagnetic input by the first actuator to the first actuator plate based on the measured change in the first actuation gap; wherein,
    the electromagnetic signal provides an actuation force to the first actuator plate;
    the actuation force provided to the first actuator plate provides haptic output to a user through the first actuator plate and the trackpad; and
    the provided haptic output is consistent across different measured changes in the first actuation gap.

14. The method of claim 13 wherein the step of measuring includes capacitively measuring the first actuation gap.

15. The method of claim 13 wherein the step of measuring includes optically measuring the first actuation gap.

16. The method of claim 13 wherein the step of measuring includes measuring an eddy current in the first actuator plate.

17. The method of claim 13 further including the step of measuring a second actuation gap between a second actuator and a second actuator plate associated with the trackpad.

18. The method of claim 17 further including using the second actuator and the second actuator plate to prevent contact of the trackpad with a housing of a portable electronic device.

19. The method of claim 13 further comprising:
   determining the location of the user touch correlates with a user interface element selection; and
   determining the force exceeds a threshold; wherein,
   the electromagnetic input is further applied to the actuator based on the location determination and the force determination.

* * * * *